Patented Oct. 14, 1930

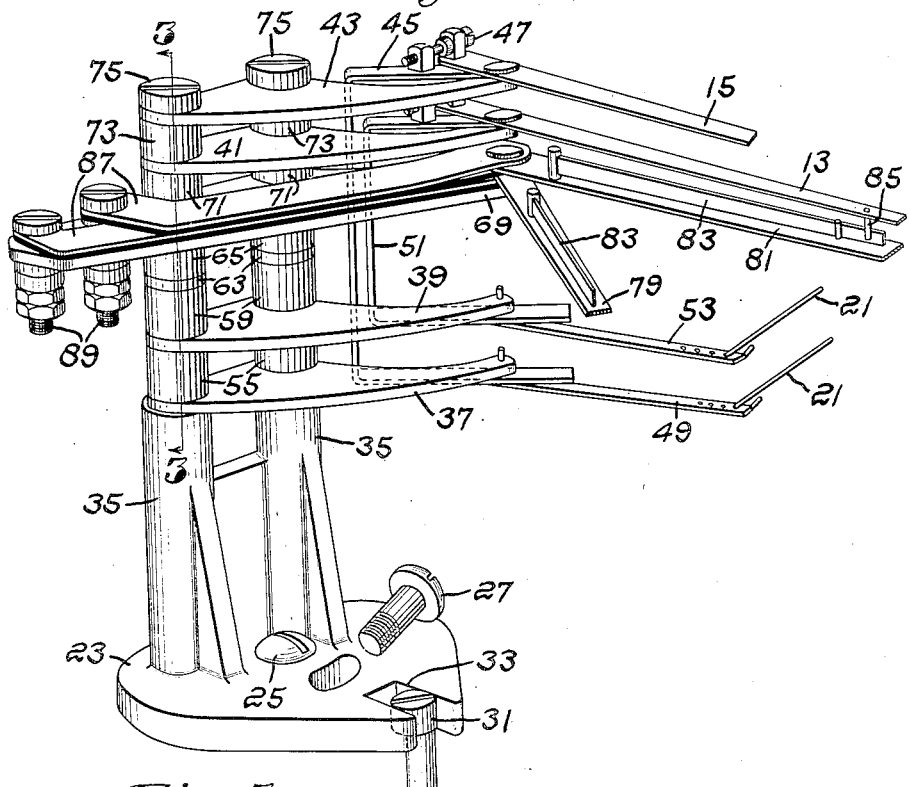
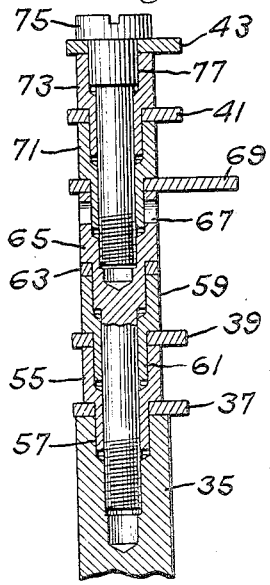

1,778,702

UNITED STATES PATENT OFFICE

BENJAMIN H. BRISTOL AND ARTHUR G. BEAL, OF FOXBORO, MASSACHUSETTS, ASSIGNORS TO THE FOXBORO COMPANY, OF FOXBORO, MASSACHUSETTS, A CORPORATION OF MASSACHUSETTS

INDICATING AND RECORDING INSTRUMENT

Application filed December 29, 1926. Serial No. 157,694.

This invention relates to instruments for indicating, recording or controlling responsively to the action of some moving device which in turn is actuated, mechanically or otherwise, by some effect or action which it is desired to observe, to record or to utilize as a governing agency. The moving device may, and in perhaps the major field of application would, operate responsively to the fluctuations of some variable such, for instance, as temperature or pressure. A specific example of such as mechanism is a recording pressure gage and such a gage is herein illustrated as an illustrative embodiment of an application of the invention. A primary object of the invention is to provide in an instrument of this character an improved construction for supporting the indices, such as recording pens, and mechanism correlated therewith.

The invention will be well understood by reference to the following description of the illustrative embodiment thereof shown by way of example in the accompanying drawings, wherein:

Fig. 2 is a perspective view of the supporting mechanism for the pen arm shafts detached; and Fig. 3 is an enlarged section on the line 3—3 of Fig. 2.

Figure 1:
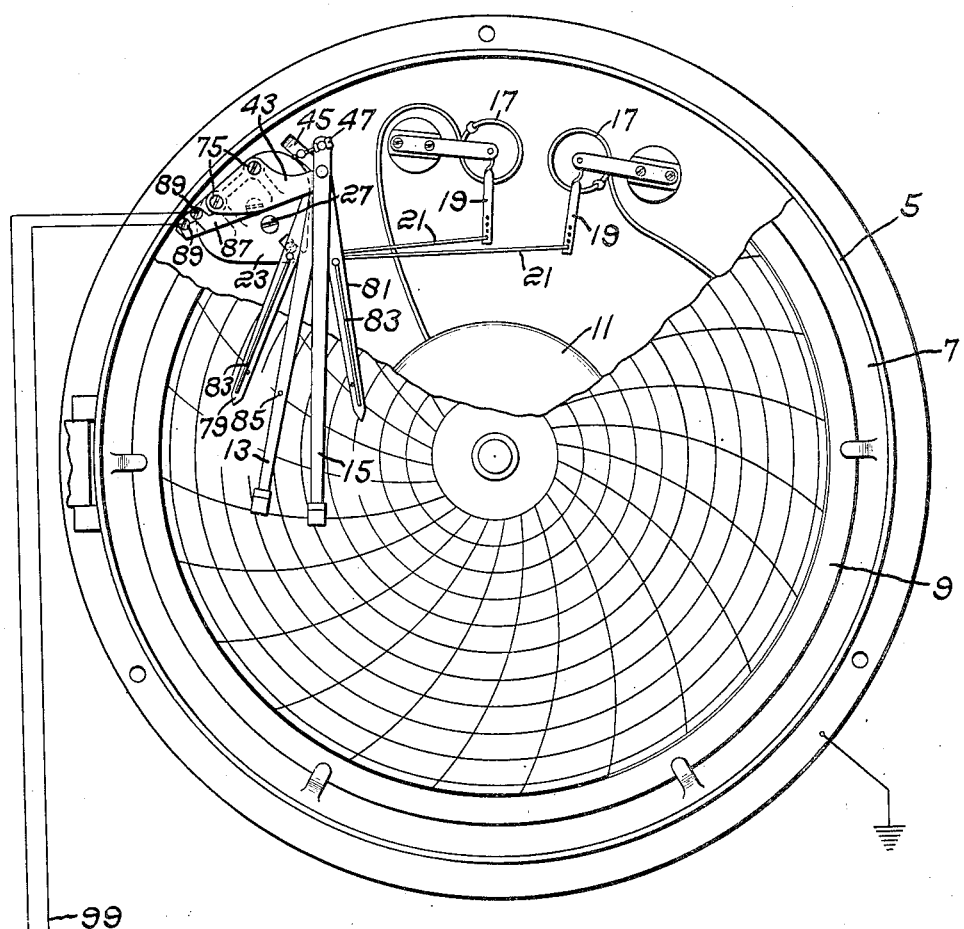
Fig. 1 is a front elevation of a recording pressure gage with electrical alarm attachment, parts being broken away to disclose the interior construction and part of the alarm attachment being disclosed in the manner of a wiring diagram.

While not limited thereto, the invention finds a particular application to instruments having a plurality of indices moving about the same center of motion and, while again not limited thereto, is particularly adaptable to instruments wherein the axis of motion eccentrically intersects the dial plate. As an example of the invention there has therefore been herein illustrated a two-pen recording instrument in which the pens swing about a center line intersecting the recording chart. To further disclose certain advantages of the construction there has been illustrated an electric mechanism cooperating with one of the pens, the mechanism herein being adapted to give an alarm when a variable reaches predetermined high and low values.

Referring to Fig. 1 of the drawings, the instrument is organized in a suitable casing 5 closed by the plate 7 on which rests the usual polar chart 9 adapted to be rotated thereover by the clock 11. Inner and outer pen arms 13 and 15 are adapted to swing about the same center of motion over the chart. As appears from Fig. 1, the casing 5 is of the round type and the pivotal axis of the pen arms intersects the chart. The pen arms may be operated by suitable measuring instrumentalities such as helical tubes 17, similar to those disclosed in the patent to E. H. Bristol, No. 1,195,344, dated August 22, 1916, which turn shafts carrying crank arms 19, the motion of which is communicated to the pens through connecting rods 21 in a manner which will more clearly appear as the description proceeds.

In the embodiment of the invention shown the pens and the shafts which turn the same and are themselves turned by the measuring instrumentalities are organized on a unitary supporting structure which may be mounted on the back of the casing 5. Referring to Fig. 2, this may embody a base 23 which may be secured to the back of the case by the screws 25 and 27, the screw 27 preferably entering an enlarged hole 29 and permitting the angular adjustment of the base about screw 25 as a pivot by means of the eccentric 31 swivelled in the back of the case and taking in the slot 33 in the base 23, this eccentric being provided with suitable means for turning the same, herein illustrated as a screw-driver slot. The base may thus be swung about the screw 25 as a center and secured in adjusted position by setting up the screws 25 and 27.

Rising from the base 23 are bosses 35 which may be considered the inner portions of pillars supporting suitable bracket plates 37, 39, 41 and 43 which provide bearings for the pen-carrying shafts. These pillars are preferably of the compound or built up construction which will presently be described. There are here illustrated four bracket plates providing a pair 37 and 43 distal to the others in which is journalled the shaft of the outer pen 15 and the pair 39 and 41 in which is journalled the shaft of the inner pen 13. The plates may also be considered as divided into inner and outer sets, the inner set comprising the plates 37 and 39 and being disposed inwardly of the plane of the chart 9 and the outer set comprising plates 41 and 43 being disposed upwardly thereof, the edge of the chart and of the plate 7 being received in the open space between plates 39 and 41 clearly shown in Fig. 2. These plates may be clamped at two points to the bosses 35 to be supported in spaced parallel relation and have projecting overhanging portions extending to the axis of motion of the pen arms and on which the shafts are journalled.

The outer pen 15 may be carried by a shaft journalled in the outermost plate 43 and in the innermost plate 37 and to permit the shaft for the inner pen to be received therebetween the shaft 45 for the pen 15 is cranked, being of U shape form with an offset central portion, the ends of the arms of the U being pivoted to the bracket plates, preferably by means of trunnions at the ends thereof taking into the plates and projecting toward one another, as clearly disclosed by Fig. 2. To the outer arm of the U at the center of motion of the pen movement the arm 15 is secured, preferably with provision for micrometer adjustment by means of the adjusting screw 47, as described in patent to E. H. Bristol, No. 1,283,395, dated October 29, 1918, and the shaft may be turned by means of a crank arm 49 secured to the inner arm of the U to which is secured one of the connecting rods 21. The inner pen 13 may be operated in a similar manner by a similar U-shaped shaft 51 adapted to swing within the confines of the longer and deeper U 45 and which carries the pen 13 in similar fashion and a crank arm 53 corresponding to the crank arm 49 of the other shaft. The U shape form of the shafts permits them to extend around the edge of the chart which in the example of the invention shown is intersected by the axis of motion in which the shafts are pivoted.

It will be seen from this description that the shafts 45 and 51 are pivoted at their ends in widely spaced bearings while at the same time the assembly is compact. Also, the pens 13 and 15 have a direct support substantially at their pivotal centers.

The bracket plates may be assembled on the base 23 with the aid of suitable spacers interposed therebetween. A preferred arrangement is disclosed in detail in Fig. 3 and the construction and advantages may be most readily understood if it is described in connection with the manner in which the assembly of the parts may be effected. In what follows to avoid confusion in following Fig. 3 the singular will be used, but as appears from Fig. 2 the plates are each held at two points.

Referring, therefore, to Fig. 3, the plate 37 may be superposed upon the boss 35 and temporarily secured in position by the application of a tubular spacer 55 having an enlarged recessed head, which serves as a spacing collar between the plate 37 and the succeeding plate 39, and a reduced portion 57 adapted to pass through a hole in plate 37 and enter a suitable recess in boss 35 as shown. It will be noted that on account of this telescoping construction the spacer 55 will maintain itself in position during the assembly and will also temporarily hold plate 37. The plate 39 may then be applied over the enlarged head of spacer element 55. The support shown in Fig. 3 is of such dimensions as would accommodate six plates and for reasons which will hereinafter appear and to provide for interchangeability in various types of instruments the plate 39 may have applied over the same a spacer member 59 similar to the member 55 and having the reduced portion 61 entering the recess in the enlarged head of member 55 and on top of member 59 may be applied a blanking washer 63.

The positioning of the inner set of bracket plates is now completed and it is preferred to clamp them in position independently of the outer set of plates so that the latter may be removed or changed as desired without disturbing the inner set and for this purpose a clamping screw 65 is utilized having a head corresponding in form to the spacers 55 and 59 with an enlarged spacing portion, which herein overlies the washer 63, a reduced portion telescoping into the recessed head of spacer 59 and a shank extending through the several spacers and tapping into boss 35 as shown. The head of the screw 65 may be suitably formed to permit it to be set up, preferably by means of a diametrical opening 67 therethrough adapted to receive a turning tool. This arrangement affords a secure hold for tightening the screw and avoids the danger of any portion becoming burred or otherwise marred in such a manner as to cause an inaccuracy in the assembly.

In the embodiment of the invention shown a plate 69 corresponding in the outer set of elements to the blanking washer 63 in the inner is applied over the head 65 and secured temporarily in position by a spacer 71 corresponding in construction to the elements 55 and 59. On this is to be superimposed one of the outer plates, 41. At this point in the assembly the shaft 51 is adjusted. For this purpose the outwardly facing trunnion at the inner end is hooked into its bearing in the plate 39 (see Fig. 2) and the plate 41 is passed outwardly over the inwardly facing trunnion in the outer end of the shaft, thus bringing the plate into the plane of the outer face of spacer 71. The plate 41 is then swung about this pivot until it overlies the spacer 71, whereupon it may be temporarily secured in self-maintaining position by the application of the spacer 73 which is in construction like 71, 55 and 59. It will be noted that in this operation, since it is not necessary to thread the plates over any supporting elements, that the assembly is permitted without any springing of the shaft 51. At the same time because of the telescoping relation of the elements the parts are self-maintained until it is time finally to clamp them in position. The plate 43 and its shaft 45 may then be brought into the assembly in similar manner and the parts may then be finally clamped by means of the screw 75 having an enlarged head overlying the plate 43, a reduced portion 77 fitting the recess in spacer 73 and a shank which extends through the spacer elements 73 and 71 and taps into the head of screw 65.

It will be clear that with the elements shown in Fig. 3 three shafts might be supported by the utilization of suitable bracket plates in place of the washer 63 and plate 69. To show the adaptability of the construction there is herein shown the use of such a blanking washer and the plate 69, the latter being adapted to support suitable auxiliary mechanism which as herein disclosed takes the form of an electric contact device cooperating with the inner pen 13 and which may be utilized for any desired purpose, an alarm being herein shown. The alarm mechanism may comprise two index arms 79 and 81 mutually insulated and pivoted on plate 69 on the same axis of motion as the shafts. These arms may extend over the chart, as shown in Fig. 1, and may be manually set in desired position utilizing the chart as a scale. The arms carry yieldable contacts 83 adapted to be engaged and displayed by a pin 85 projecting from arm 13. The inner ends of the arms adjacent their pivots on the plate 69 make brush contact with mutually insulated conducting plates 87 which extend to some convenient remote point where they may be provided with the binding posts 89 which preferably find a support in the plate 69. Referring to Fig. 1, if the arm 13 swings to the left in that figure until the pin 85 projecting therefrom engages contact 83 on the arm 79, the following circuit will be closed. From the battery 91 through wires 93 and 95 to the bell 97, thence through wire 99 and binding post 89 to contact 83 on the arm 69, and thence through the pen arm 13 to the case 5 of the instrument which is grounded. Similarly, if the pen 13 swings to the right to engage the contact on arm 81, the buzzer 101 is operated.

It will be noted that the arms 79 and 81 are firmly supported in the same center of motion as the pens and because of the support on the plate directly at their pivots are unlikely to get out of order when manually adjusted. Furthermore, they and the connecting mechanism therefor may be assembled on the plate 69 and easily incorporated in the movement as a whole or removed therefrom when desired.

The entire mechanism, including the pens and their shafts and the auxiliary mechanism, such as the electric alarm, if present, may be adjusted by means of the eccentric 31 shown in Fig. 2, if desired, to compensate for error in construction of clocks, movements or cases. The purpose of this adjustment is to provide for the positioning of the center of movement of the arms in such manner that the distance from this center to the center of the chart shall be equal to the radius of the time arc on the chart so that the pen as it swings will follow the time arc perfectly.

It will be clear from the description which has been given that the shafts which are moved by the measuring instrumentalities and which move the pens are each firmly supported and on widely spaced bearings. At the same time an assembly involving a plurality of such shafts turning in the same center of motion is exceedingly compact. Since the moving parts are firmly held at the most advantageous places, they may be made very light without danger of distortion in use or in handling.

The construction is simple and as is apparent from the description above given may be very easily assembled and likewise removal or replacement of the parts is very readily effected. A wide variety of applications is possible and standardized parts may be utilized, if desired, in instruments of widely varied character. Attachments such as the electric alarm attachment herein illustrated by way of example can very easily be incorporated.

When the construction is utilized in a multiple pen instrument as herein shown, the positions of the marking points of the pens may be made very close without danger of interference since they are firmly suspended from the center of motion and thus the time error in multiple pen instruments may be made very small. The inking, cleaning and replacing of the pens is easier and safer due to the pen arm being firmly fixed and not easily pulled out of position. Adjustments of the micrometer screw such as 47 on the pen arm are easy and safe due to the firmly fixed arm and bracket which make it easy and safe to use a screw-driver.

One particular form of the invention has been described in detail in order that the features of construction utilized therein might be clearly understood. Obviously, however, the mechanical construction and the particular relation and combination of parts herein disclosed are exemplary merely and consequently the detailed character of the description is not to be taken as in any way definitive of the scope of the invention. The principles underlying the invention may be embodied in widely different forms and for widely different purposes and with great latitude of mechanical construction. What is claimed as new and what it is desired to secure by Letters Patent will be expressed in the following claims.

Claims:

1. In an instrument the constituent mechanism comprising a base, a pair of spaced brackets supported thereby and projecting laterally therefrom, a cranked shaft pivoted at its ends in said brackets and having at one end an index and at the other means for connecting a measuring instrumentality thereto.

2. In an instrument the constituent mechanism comprising a base, pairs of spaced brackets supported thereby and projecting laterally therefrom, a shaft journalled in the inner adjacent brackets, a cranked shaft having its ends journalled in the same axis of motion in brackets outward of said inner ones and indices operated by the shafts.

3. An instrument having a dial, supports extending inwardly over the edge thereof from a side of the same, a shaft having an offset embracing an edge of the dial and pivoted on said support to move about an axis intersecting the dial, an index connected to one end of the shaft and an actuating instrumentality connected to the other.

4. In a multiple index instrument a shaft journalled at its ends and having an index at one end thereof, a second shaft having an offset portion paralleling the first and pivoted at its ends distally of said first shaft in the same axis of motion and having an index at one end thereof and at least one of said shafts having an actuating instrumentality connected to the other end thereof.

5. In a multiple index instrument a plurality of U-shaped shafts pivoted at their ends in a common axial line and free to swing one within another, indices carried by the ends of said shafts on the one hand and at least one of said shafts having an actuating instrumentality connected to the end thereof on the other hand.

6. An instrument embodying the structure of claim 5 and having a dial plate which intersects said axial line and the edge of which is embraced by said shafts.

7. In an instrument of the class described a base, an inner bracket carried thereby, an outer bracket, said brackets having laterally projecting portions providing bearings for a shaft and means for securing together said outer bracket in spaced relation to the inner comprising a set of elements constructed to be serially telescoped into self-sustaining relation in assembly of the same and the outer bracket with the inner bracket-carrying structure.

8. In an instrument of the class described an inner bracket plate and an outer bracket plate, means for securing the latter in spaced relation to the former comprising a series of parts, certain of which receive the plate between them and which have inner portions adapted to be telescopically received in a cooperating part inwardly thereof, said plates having bearings therein, a cranked shaft having pivots directed inwardly toward each other received in the bearings and driving and driven elements connected to said shaft.

9. In an instrument of the class described an inner bracket plate and an outer bracket plate, a part lying outwardly of the inner plate and on which the outer plate may rest to be supported in spaced position from the inner, said part being recessed, and a securing part passing through the outer plate and entering said recess, said plates having laterally projecting parts having bearings therein, a cranked shaft having pivots directed inwardly toward each other received in the bearings and driving and driven elements connected to said shaft.

10. In an instrument of the class described a plurality of bracket plates having laterally projecting portions providing bearings for one or more shafts and means for securing together the plates in spaced relation comprising a set of elements adapted to receive and clamp said plates between them and constructed to be serially telescoped one with another into self-sustaining relation in assembly with said plates.

11. In an instrument the constituent mechanism comprising a base, carrying an inner bracket plate and an outer bracket plate, spacing means interposed between the plates, means for clamping said parts together, said brackets having projecting or overhanging portions, a cranked shaft pivoted at its ends in said portions and having at one end an index and at the other end means for connecting an actuating instrumentality thereto.

12. In an instrument the constituent mechanism comprising a base, one or more inner bracket plates, one or more outer bracket plates, spacing means interposed between the plates, means for clamping the inner plates and associated spacing means and means for independently clamping the outer plates and associated spacing means, said plates having projecting or overhanging parts providing shaft bearings, an inner and an outer plate providing for the support of a shaft and one or more shafts having provision for connecting driven and driving elements to the ends thereof respectively.

13. In a shaft-supporting frame-work for a measuring instrument a set of bracket plates, elements which mutually slidably telescope to receive the plates between them and support them in spaced relation and means for binding together said parts, said plates having overhung portions provided with shaft bearings.

14. In a frame-work for supporting a plurality of shafts in a measuring instrument inner and outer sets of bracket plates, collars which mutually slidably telescope to receive the plates between them and support them in spaced relation, a screw extending through the collars to secure the inner set of plates and a screw similarly to secure the outer set of plates tapping into the head of the first screw, said plates having overhung portions provided with shaft bearings.

15. In a mechanism of the type described a base portion, a bracket plate resting thereon, a screw tapping into the base to secure said plate, a second plate and a screw to secure the same tapping into the head of the first, and bearings in said plates receiving a shaft.

16. In a mechanism of the type described a base, a series of apertured plates, spacers between the plates having recessed enlarged heads and reduced shanks which pass through the plates and are received in the recesses of an underlying element and means for binding together the assembly, said plates having overhanging portions providing shaft bearings.

17. In a dial instrument a unitary support comprising a pair of bracket plates disposed forwardly of the plane of the dial in mutually fixed relation, a shaft responsive to the action of a measuring instrumentality having an end bearing in one of said plates, an index at said end of the shaft cooperating with the dial and an electric mechanism comprising contacts cooperating with said index supported on another of said plates.

18. In a dial instrument a support comprising a base, a plurality of bracket plates demountably assembled on said base in mutually fixed relation to provide a unitary structure, a shaft responsive to the action of a measuring instrumentality having an end bearing in one of said plates, an index at said end of the shaft cooperating with the dial and an electric mechanism comprising contacts cooperating with said index supported on another of said plates.

19. In a recording instrument a frame-work having an extended base to rest against a wall of the case of the instrument, shaft bearings in said frame-work, a shaft journalled therein, a pen on the shaft, means for connecting a measuring instrumentality to the shaft, means for securing said base to said wall including a member providing a center about which the same may be swung and an adjusting device providing means for moving bodily said frame with the shaft and pen about said center.

20. In a recording instrument a frame-work having an extended base to rest against a wall of the case of the instrument, shaft bearings in said frame-work, a shaft journalled therein, a pen on the shaft, means for connecting a measuring instrumentality to the shaft, means for securing said base to said wall including a member providing a center about which the same may be swung, a cam bearing against the base and having means exposed toward the front of the instrument to provide for turning the same and serving adjustably to move bodily said frame with the shaft and pen about said center.

In testimony whereof, we have signed our names to this specification.

BENJAMIN H. BRISTOL.
ARTHUR G. BEAL.